United States Patent
Tione et al.

(10) Patent No.: US 8,439,454 B2
(45) Date of Patent: May 14, 2013

(54) BRAKING UNIT FOR A TRAIN COMPRISING A PLURALITY OF WAGONS FOR GOODS TRANSPORTATION

(75) Inventors: Roberto Tione, Lauriano (IT); Roberto Correndo, Carmagnola (IT); Angelo Grasso, Canelli (IT); Barry Wilfred Payne, Bundamba (AU)

(73) Assignee: Faiveley Transport Italia S.p.A., Piossasco (IT)

( * ) Notice: Subject to any disclaimer, the term of this patent is extended or adjusted under 35 U.S.C. 154(b) by 219 days.

(21) Appl. No.: 13/125,917

(22) PCT Filed: Oct. 23, 2009

(86) PCT No.: PCT/IB2009/054693
§ 371 (c)(1),
(2), (4) Date: Apr. 25, 2011

(87) PCT Pub. No.: WO2010/046880
PCT Pub. Date: Apr. 29, 2010

(65) Prior Publication Data
US 2011/0203880 A1      Aug. 25, 2011

(30) Foreign Application Priority Data

Oct. 24, 2008   (IT) .............................. TO2008A0785

(51) Int. Cl.
*B60T 13/68* (2006.01)
(52) U.S. Cl.
USPC ............................. 303/81; 303/7; 188/112 R
(58) Field of Classification Search .................. 188/3 R, 188/3 H, 112 R; 303/7, 8, 66, 81, 82
See application file for complete search history.

(56) References Cited

U.S. PATENT DOCUMENTS

| 6,036,284 | A | 3/2000 | Pettit et al. | |
|---|---|---|---|---|
| 6,648,422 | B2* | 11/2003 | Root et al. | 303/7 |
| 2005/0029859 | A1* | 2/2005 | Bensch et al. | 303/89 |
| 2005/0099061 | A1* | 5/2005 | Hollandsworth et al. | 303/7 |
| 2009/0057072 | A1* | 3/2009 | Wood et al. | 188/34 |
| 2011/0203880 | A1* | 8/2011 | Tione et al. | 188/34 |

FOREIGN PATENT DOCUMENTS

| WO | 02/22421 A2 | 3/2002 |
|---|---|---|
| WO | 2006/124083 A2 | 11/2006 |

OTHER PUBLICATIONS

International Search Report for PCT/IB2009/054693.

* cited by examiner

*Primary Examiner* — Christopher Schwartz
(74) *Attorney, Agent, or Firm* — Sughrue Mion, PLLC

(57) ABSTRACT

A braking system for a train comprises a pneumatic brake pipe (BP), which extends along the train, and in which the pressure is controlled by a braking control apparatus (BCA) in the locomotive (L), and an electrical power supply and signal line (EL), which equally extends along the train, and which is linked to an electronic control unit (ECU) in the locomotive. Each wagon (W) in the train comprises a pneumatic brake valve (ELV) coupled with the brake pipe (BP) and suitable for applying to brake cylinders (BC) of the wagon (W) a brake pressure that is a function of a control pressure applied to a control input (CI) thereof; and an electro-pneumatic control assembly (EPC) including solenoid valve control devices (EVF, EVS), coupled with the brake pipe (BP) and with which a first pressure accumulator (DVE) is associated.

7 Claims, 5 Drawing Sheets

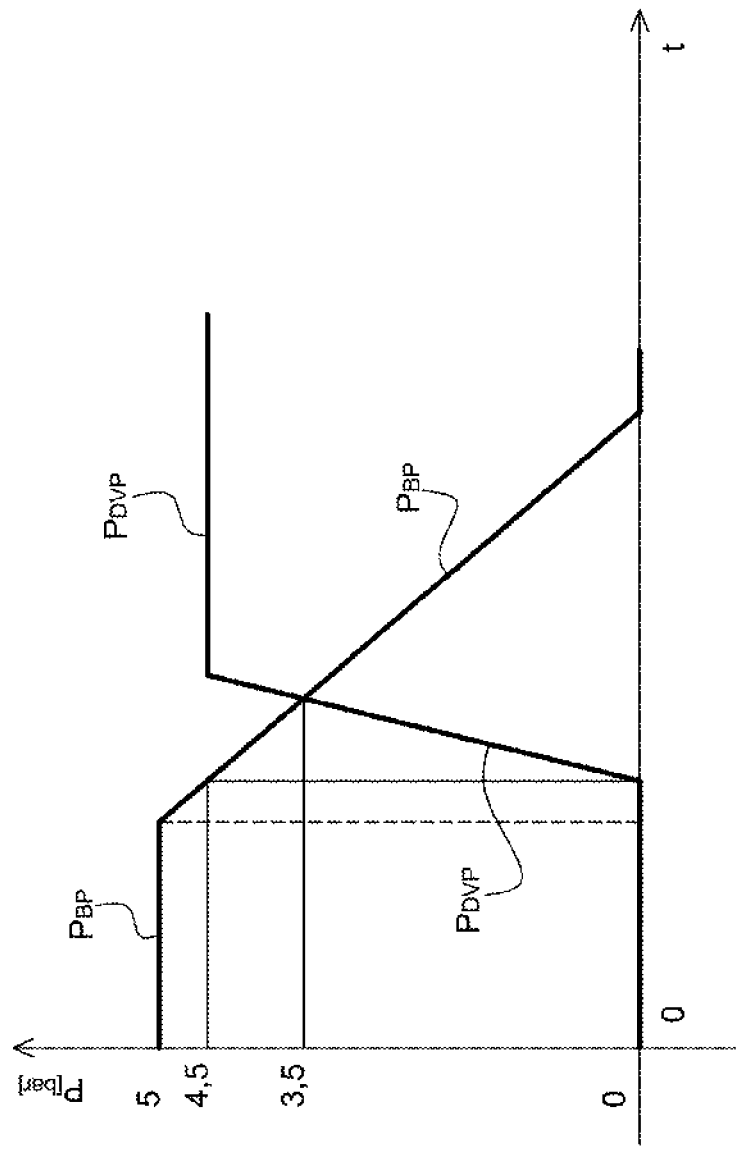

BRAKING UNIT FOR A TRAIN COMPRISING A PLURALITY OF WAGONS FOR GOODS TRANSPORTATION

CROSS REFERENCE TO RELATED APPLICATION

This application is a National Stage of International Application No. PCT/IB2009/054693 filed Oct. 23, 2009, claiming priority based on Italian Patent Application No. TO2008A000785, filed Oct. 24, 2008, the contents of all of which are incorporated herein by reference in their entirety.

The present invention refers to braking units for trains.

More specifically, the invention relates to a braking unit for a train that includes a plurality of wagons for goods transportation.

An object of the present invention is to provide an improved braking unit for such trains for goods transportation.

This and other objects are achieved according to the invention with a braking unit comprising
- a pneumatic brake pipe, which extends along the train, and in which the pressure is controlled by a braking control apparatus in a locomotive;
- an electrical power supply and signal line, which equally extends along the train, and which is linked to an electronic control unit in the locomotive;

the unit also comprising, in each wagon:
- a pneumatic brake control valve coupled with the brake pipe and suitable for applying a brake pressure to brake cylinders of the wagon that is a function of a control pressure applied to a control input thereof; and
- an electro-pneumatic control assembly including:
- solenoid valve control means, coupled with the brake pipe and with which a first pressure accumulator is associated; said solenoid valve means being able to be selectively activated through signals sent through said line for applying a predetermined control pressure to the pneumatic brake control valve;
- a pneumatic pressure modulator valve assembly with a preloaded spring, with which a second pressure accumulator is associated, and which is coupled with the brake pipe and is able to be connected to said control input of the pneumatic brake valve; and
- selector means associated with the pneumatic brake control valve to couple its control input normally with the aforementioned solenoid valve means, and to couple said control input with the pressure modulator valve assembly when the pressure in the brake pipe falls below a predetermined value.

Further characteristics and advantages of the invention shall become clearer from the following detailed description, provided purely as a non-limiting example, with reference to the attached drawings, in which:

FIG. 2a is a graph that shows operating characteristics of a pneumatic pressure modulator valve group located on each wagon.

Figure 1:
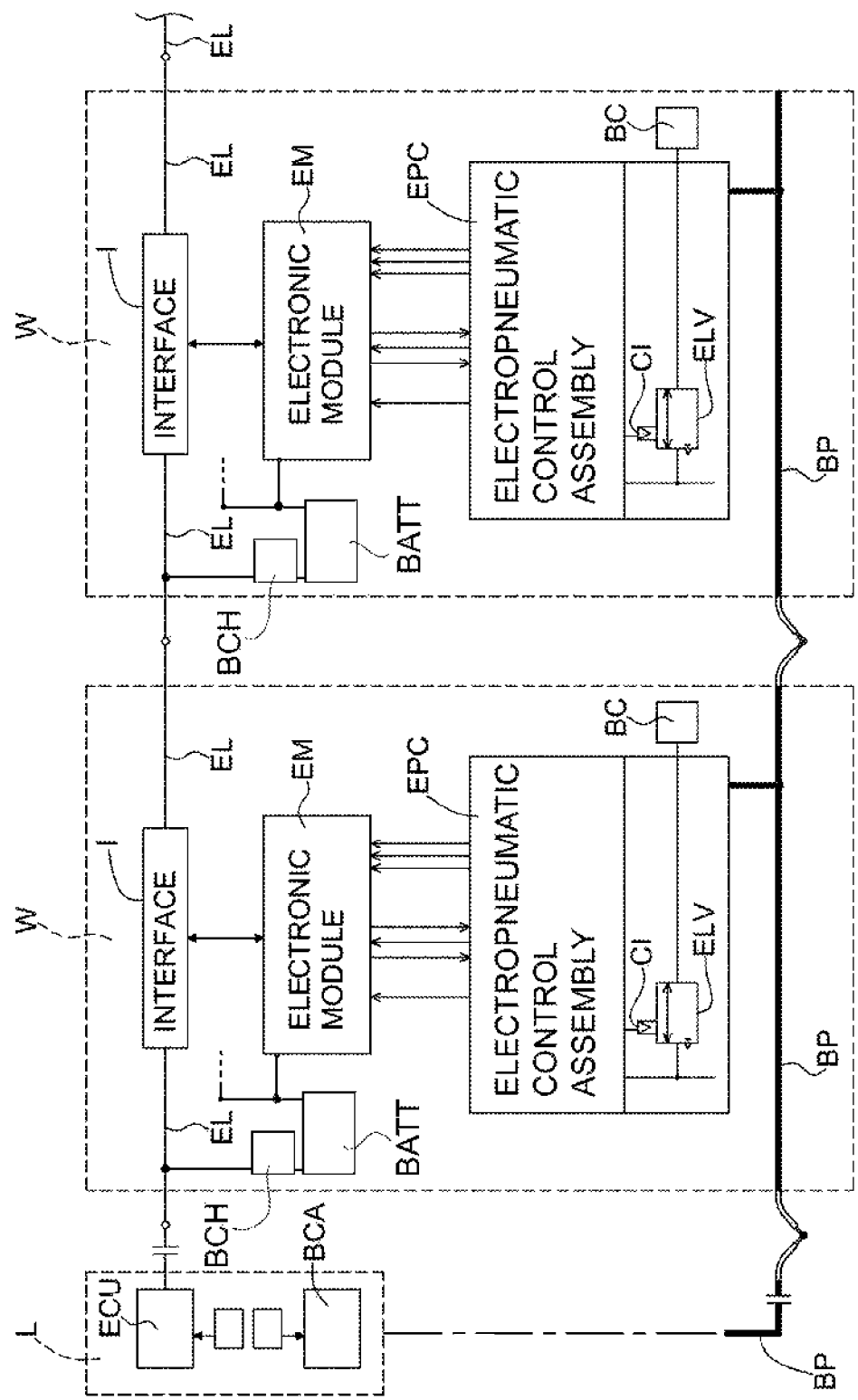
FIG. 1 is a diagrammatic representation, in block form, of a braking unit according to the invention for a train for goods transportation.

In FIG. 1 a braking unit according to the present invention, for a train set comprising at least one locomotive L and a plurality of wagons W for goods transportation, is indicated as a whole with 1.

The braking unit 1 comprises a pneumatic brake pipe BP that extends from the locomotive L along the entire train. In a per se known manner, the pressure in the brake pipe BP is controlled by a brake control apparatus BCA in the locomotive.

In the brake pipe there is normally a predetermined pneumatic pressure, for example equal to 5 bar. In order to cause a pneumatic braking of the train the pressure in the pipe BP is reduced, by coupling said pipe to an exhaust, in a controlled manner.

An electric power supply and signal line EL, which is linked to an electronic control unit ECU equally located in the locomotive L, also extends along the train.

In each wagon W the electric line EL is coupled with a respective electronic module EM through an interface I.

Furthermore, in each wagon W the line EL is connected to a battery-charger BCH, which is in turn connected to a power supply battery BATT.

The electronic module EM of each wagon W is in turn coupled with an electro-pneumatic control assembly EPC, associated with a pneumatic braking valve ELV. The module EM is also physically separate from the assembly EPC.

As shall become clearer hereinafter, the brake valve ELV of each wagon W is locally coupled with the brake pipe BP, and is suitable for applying to the brake cylinders BC of the corresponding wagon a braking pressure that is a function of a control pressure applied to a control input CI thereof.

Figure 2:
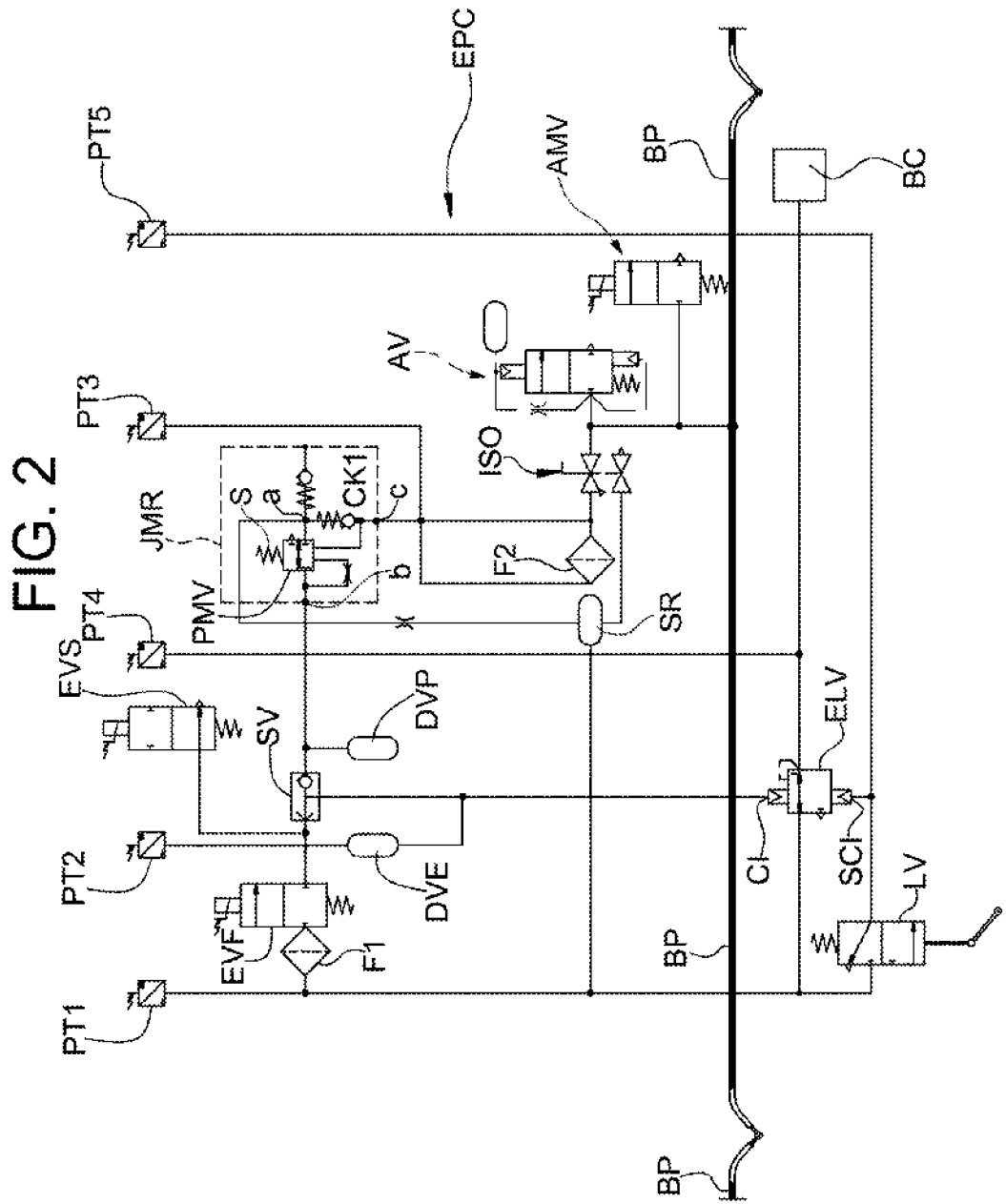
FIG. 2 is a detailed diagram of a first embodiment of the portion of the braking unit located on a single wagon of the train.

With reference to FIG. 2, the electro-pneumatic control assembly EPC in the illustrated embodiment comprises two control solenoid valves EVF and EVS.

Figure 3:
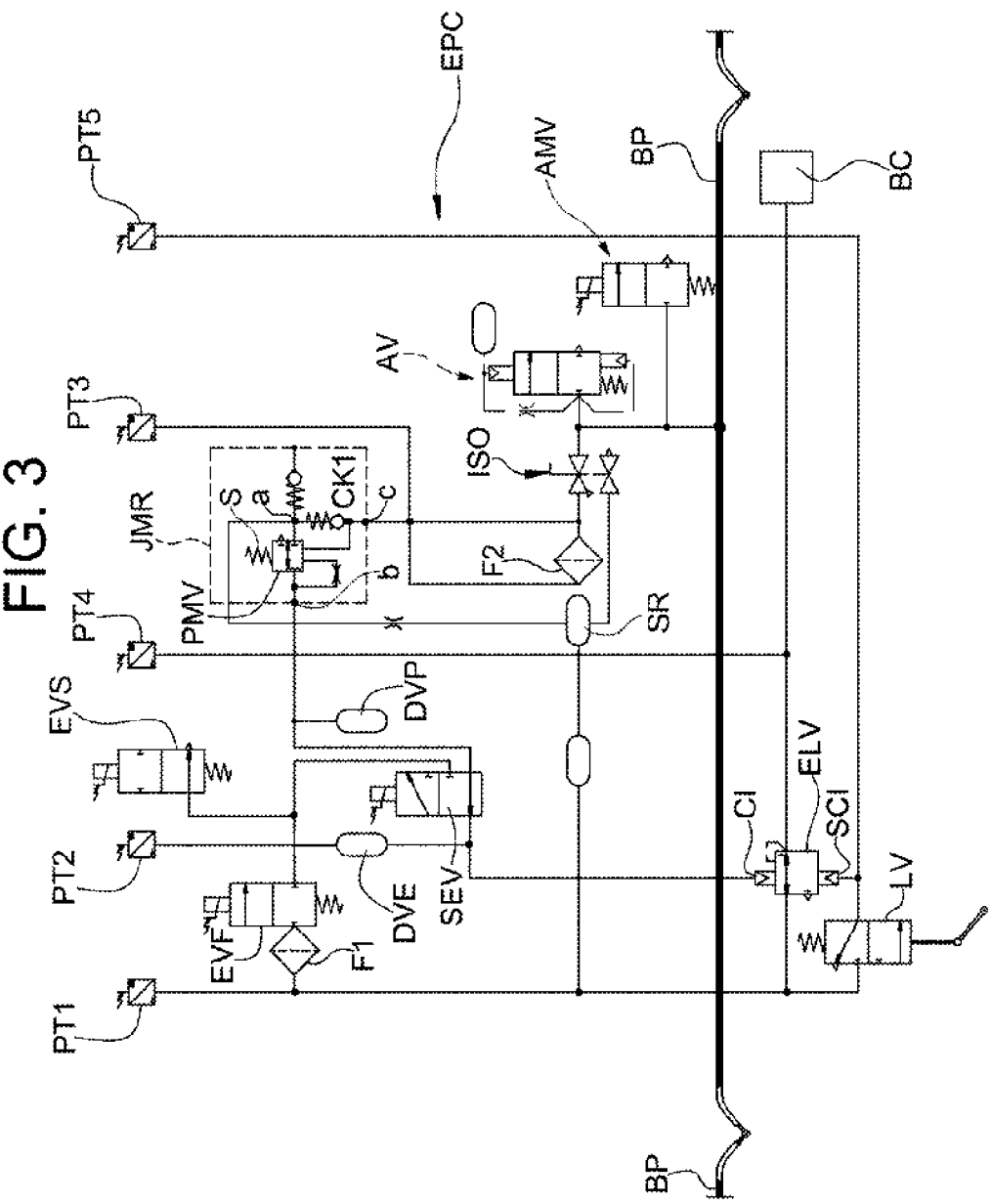
FIGS. 3 and 4 are diagrams similar to the one presented in FIG. 2, and show two different variant embodiments.
Figure 4:
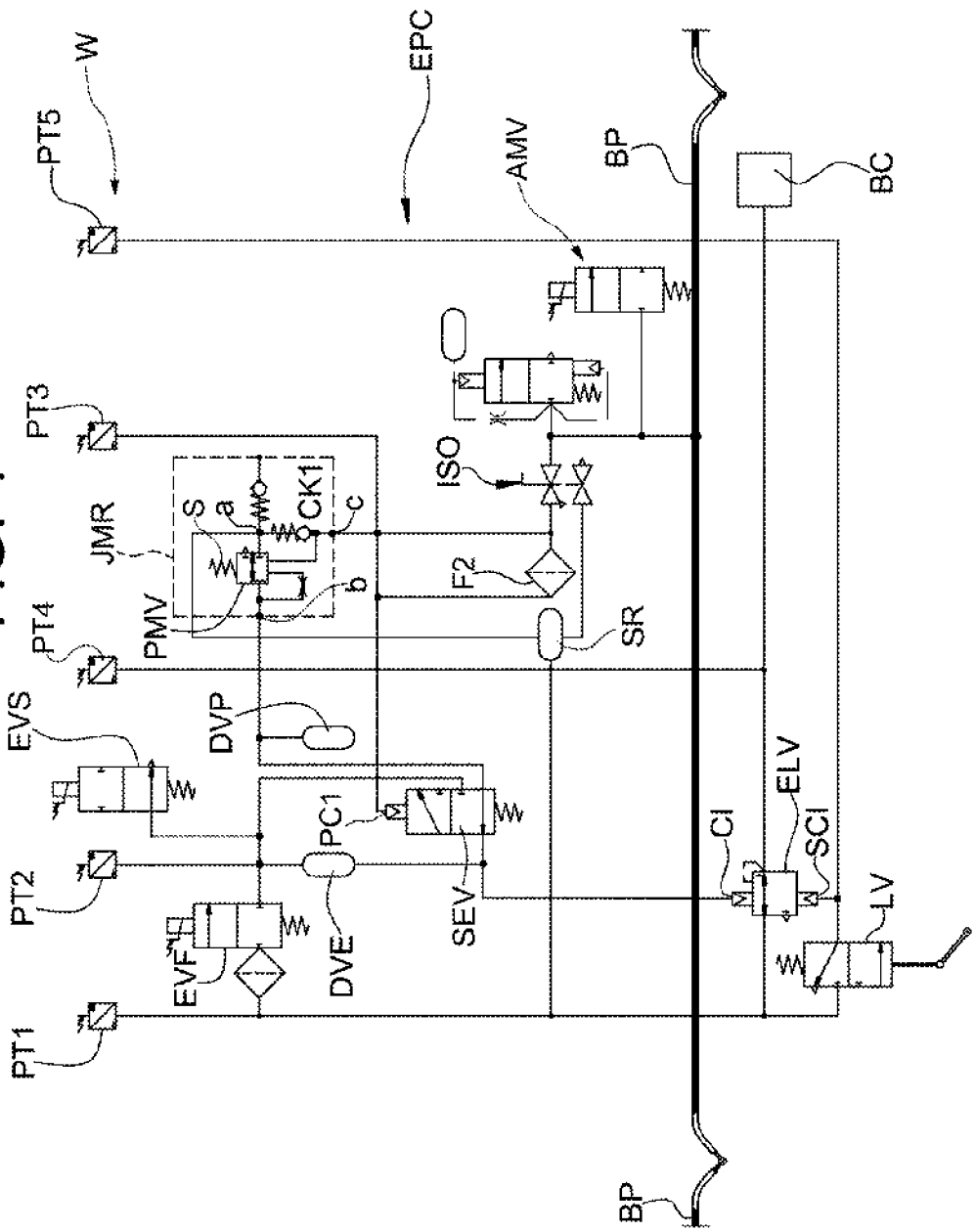

In relation to the diagrams of FIGS. 2, 3 and 4 it should be remembered that, in a conventional way, they show the state of the various devices without air in the pneumatic pipes and without voltage on the electrical lines.

The solenoid valve EVF has an input connected to a pressure reservoir SR through a filter F1. Said reservoir SR is coupled at the input with the brake pipe BP through a multifunction isolation cock ISO and a filter F2.

The output of the solenoid valve EVF is connected to a first input of a pneumatic selector valve SV, and the input of the second solenoid valve EVS. The output of the selector valve SV is connected to a pressure accumulator or reservoir DVE. The solenoid valve EVS controls the coupling of the accumulator DVE with the external environment.

A first and a second electrical pressure transducer PT1 and PT2 indicate to the electronic module EM of the wagon the pressure values at the accumulators SR and DVE, respectively.

Through the isolation cock ISO, the brake pipe BP is also coupled with a pneumatic pressure modulator valve assembly JMR.

The assembly JMR essentially comprises a proportional pressure modulator reservoir PMV, having an input a connected to the pressure reservoir SR. Such a pressure modulator valve PMV is essentially provided to supply at the output b a control pressure substantially proportional to the difference between a first force that corresponds to the pressure in the pipe BP, applied (through the cock ISO and a filter F2) to an input c of the modulator assembly, and a second force produced by a preloaded retaining spring S.

A check valve CK1 with preloaded spring is arranged between the input c of the assembly JMR and the input a of the modulator valve PMV.

An electrical pressure transducer PT3 is connected to the input c of the assembly, to supply electrical signals indicative of the pressure present in the operation at such an input.

The output b of the pressure modulator assembly JMR is connected to a pressure accumulator DVP, as well as to a second input of the selector valve SV.

The selector valve SV has the output connected to the control input CI of the pneumatic brake valve ELV.

Said brake valve has a second control input SCI which is connected to the output of a pneumatic weighing valve LV, which has the input connected to an output of the pressure accumulator SR. The weighing valve LV is of the per se known type, and in the operation provides at the output a control pressure dependent upon the load upon the wagon W. In the illustrated embodiment the weighing valve is of the threshold type. It could however be of the proportional type.

An electrical pressure transducer PT4 is coupled with the output of the brake valve ELV, and a further electrical pressure transducer PT5 is coupled with the control input SCI of said brake valve.

An accelerator valve assembly AV can be connected to the brake pipe BP, as shown in dashed lines in FIG. 2, for completely discharging the pressure in said pipe BP in emergency conditions.

Furthermore, also an application valve AMV can be connected to the brake pipe BP, for propagating the pressure signal from the brake pipe when the associated electronic module operates in emulation.

The braking unit according to the invention in the embodiment illustrated above with reference to FIG. 2 operates essentially in the following way.

In normal conditions, i.e. when the electrical power supply and communications network EL is operative and all of the interface apparatuses I and the electronic modules EM of the individual wagons W operate correctly, the brake pipe BP is kept at a predetermined pressure, for example 5 bars.

The control of braking and of subsequent brake-release is spread through the electrical network EL, the interface devices I and the associated electronic modules EM.

With reference to an individual wagon W, the control of braking involves the excitation of the solenoid valves EVF and EVS: through the solenoid valve EVF and the selector valve SV, in the accumulator DVE a pressure of predetermined value is accumulated, monitored through the transducer PT2.

The selector valve SV is then in the position illustrated in FIG. 2, and the pressure accumulated in the tank DVE is applied to the control input CI of the brake valve ELP, which correspondingly controls the braking pressure applied to the brake cylinders BC, with the possible correction introduced by the weighing valve LV according to the load.

For brake-release, the solenoid valves EVF and EVS are de-energised.

With the system according to FIG. 2, in emergency conditions, namely when the electrical power supply and communications network EL and/or the interface apparatuses and the electronic modules of the wagons W are not operative, braking is controlled by the apparatus BCA of the locomotive, which takes care of modulating the pressure of the brake pipe BP, for example between 5 and 3.5 bars.

The inoperative condition of the network EL and/or of the associated interface apparatuses and of the electronic modules can be detected by means of self-diagnosis functions, according to per se known methods.

When the network EL is inoperative, in each wagon W the electric/electronic apparatuses are anyway supplied with power drawn from the associated battery BATT.

When the network EL is inoperative, the system can anyway operate electrically: the electronic modules EM of the individual wagons W "read" the pressure in the brake pipe BP and interpret the pressure drop in said pipe as a request for braking action, and cause a corresponding modulation of the pressure applied to the braking cylinders BC.

In a condition of failure of the network and/or of the electronic apparatuses, the modulation of the pressure in the brake pipe BP ensures that the selector valve SV changes position, so that the modulator valve assembly JMR and the pressure accumulator DVP are now coupled with the control input CI of the brake valve ELV.

Advantageously, the pressure modulator assembly JMR has characteristics of the type represented in the graph of FIG. 2a, where $P_{BP}$ indicates the pressure in the brake pipe BP, and $P_{DVP}$ indicates the pressure of the reservoir DVP.

As can be appreciated by observing the graph of FIG. 2a, the modulator assembly JMR controls braking, but not immediately as soon as the pressure $P_{BP}$ in the brake pipe BP drops slightly with respect to the normal value of (for example) 5 bars, but rather only after such a pressure has undergone a fall by a predetermined amount, for example 0.5 bars. In this way the behaviour of the system is made substantially insensitive to the pressure fluctuations in the brake pipe BP.

FIG. 3 shows a variant embodiment. In such a figure, parts and elements already described have once again been attributed the same alphanumerical references used previously.

With respect to the embodiment illustrated in FIG. 2, in the variant according to FIG. 3 the selector valve SV is replaced with a selection electro-valve SEV.

When the power supply and communications network EL and the electronic apparatuses of the wagons W operate normally, the electro-valve SEV is kept in the condition not illustrated in FIG. 3, for which reason the pressure tank DVE is coupled with the control input CI of the brake valve ELV.

When the network EL and/or the electronic apparatuses of the wagons W fails, the electro-valve SEV switches to the condition illustrated in FIG. 3, and then the pressure tank DVP couples with the control input CI of the brake valve ELV.

FIG. 4 illustrates a further variant. Also in that figure parts and elements already described have once again been attributed the same alphanumerical references used previously.

In the variant according to FIG. 4, instead of the solenoid selector valve SEV of FIG. 3, a pneumatic selector valve SPV is foreseen, having a control input PCI connected to the input c of the pressure modulator assembly JMR.

The way of operating of the system according to FIG. 4 is intuitively similar to that of the system according to FIG. 3, and therefore it shall not be described any further.

Of course, without affecting the principle of the finding, the embodiments and the details can be widely varied with respect to what has been described and illustrated purely as a non-limiting example, without for this reason departing from the scope of the invention as defined in the attached claims.

The invention claimed is:

1. Braking unit for a train with a locomotive (L) and a plurality of wagons (W) for goods transportation, comprising
a pneumatic brake pipe (BP) that extends along the train, and in which the pressure is controlled by a brake control apparatus (BCA) in the locomotive (L),
an electric power supply and communications line (EL), which equally extends along the train set, and which is linked to an electronic control unit (ECU) in the locomotive;
the braking unit also comprising, in each wagon (W):
a pneumatic brake valve (ELV) coupled with the brake pipe (BP) and suitable for applying to brake cylinders (BC) of the wagon (W) a brake pressure that is a function of a control pressure applied to a control input (CI) thereof; and an electro-pneumatic control assembly (EPC) including:

solenoid valve control means (EVF, EVS), coupled with the brake pipe (BP) and with which a first pressure accumulator (DVE) is associated; said solenoid valve means (EVF, EVS) being able to be selectively activated through signals sent through said line (EL) for applying a predetermined control pressure to the pneumatic brake valve (ELV);

a pneumatic pressure modulator valve assembly (JMR) with a preloaded spring, with which a second pressure accumulator (DVP) is associated, and that is coupled with the brake pipe (BP) and is able to be connected to said control input (CI) of the pneumatic brake valve (ELV); and selector means (SV; SEV; SPV) associated with the pneumatic brake valve (ELV) to couple its control input (CI) normally with the aforementioned solenoid valve means (EVF, EVS), and to couple said control input (CI) with the pressure modulator assembly (JMR) when the pressure in the brake pipe (BP) falls below a predetermined value.

2. Braking unit according to claim 1, wherein the pressure modulator valve assembly (JMR) is provided to provide an output control pressure substantially proportional to the difference between a first force corresponding to the pressure in the brake pipe (BP) and a second force produced by a preloaded retaining spring (S).

3. Braking unit according to claim 1, also comprising, in each wagon (W), a pneumatic weighing valve (LV) coupled with the brake pipe (BP) and suitable for providing a control pressure of the wagon (W) to said brake solenoid valve (ELV).

4. Braking unit according to claim 1, wherein in each wagon (W) an accelerator valve suitable for speeding up the local emptying of the brake pipe (BP) is coupled with the brake pipe (BP).

5. Braking unit according to claim 1, wherein the selector means comprise a pneumatic selector valve (SV) with a first and a second input able to be selectively coupled with an output of such a selector valve according to the position taken up by a mobile shutter between said inlets.

6. Braking unit according to claim 1, wherein the selector means comprise a solenoid valve assembly (SEV).

7. Braking unit according to claim 1, wherein the selector means comprise a two-way valve assembly (SPV) with two positions, with a control input (PCI) coupled with the brake pipe (BP).

* * * * *